United States Patent
Chaudhary et al.

(10) Patent No.: US 11,699,199 B2
(45) Date of Patent: Jul. 11, 2023

(54) COMPUTER-BASED SYSTEMS FOR DETERMINING A TRAVEL TIME TO AN AIRPORT DEPARTURE POINT AND METHODS OF USE THEREOF

(71) Applicant: Capital One Services, LLC, McLean, VA (US)

(72) Inventors: Viraj Chaudhary, McLean, VA (US); Cruz Vargas, Alexandria, VA (US); Jennifer Kwok, New Rochelle, NY (US)

(73) Assignee: Capital One Services, LLC, McLean, VA (US)

( * ) Notice: Subject to any disclaimer, the term of this patent is extended or adjusted under 35 U.S.C. 154(b) by 112 days.

(21) Appl. No.: 17/094,056

(22) Filed: Nov. 10, 2020

(65) Prior Publication Data

US 2022/0148107 A1    May 12, 2022

(51) Int. Cl.

| | |
|---|---|
| *G06Q 10/00* | (2023.01) |
| *G06Q 50/14* | (2012.01) |
| *G06Q 20/20* | (2012.01) |
| *G07C 11/00* | (2006.01) |
| *G06Q 50/26* | (2012.01) |

(Continued)

(52) U.S. Cl.
CPC ......... *G06Q 50/14* (2013.01); *G01C 21/3423* (2013.01); *G01C 21/3484* (2013.01); *G06F 3/0484* (2013.01); *G06N 20/00* (2019.01); *G06Q 10/02* (2013.01); *G06Q 20/202* (2013.01); *G06Q 20/204* (2013.01); *G06Q 20/34* (2013.01); *G06Q 30/0201* (2013.01); *G06Q 50/26* (2013.01); *G06Q 50/30* (2013.01); *G07C 11/00* (2013.01); *G07C 2011/04* (2013.01)

(58) Field of Classification Search
None
See application file for complete search history.

(56) References Cited

U.S. PATENT DOCUMENTS

| 6,442,526 B1 * | 8/2002 | Vance | G06Q 10/02 |
|---|---|---|---|
| | | | 705/5 |
| 2003/0085808 A1 * | 5/2003 | Goldberg | G06Q 10/06 |
| | | | 340/988 |

(Continued)

FOREIGN PATENT DOCUMENTS

WO    WO-2005077066 A2 *    8/2005    ............. G06Q 10/02

*Primary Examiner* — Tonya Joseph
(74) *Attorney, Agent, or Firm* — Greenberg Traurig, LLP

(57) ABSTRACT

A method and system include identifying, by a processor, departing flight information that designates departure airports and departure times in payment card transaction data of a plurality of users. Airport-specific data for a departure airport before a departure time of a departing flight of a user from the plurality of users is received. The airport-specific data is inputted into a machine learning model that outputs a user-specific airport processing time for the user to reach a departure gate upon arriving to the departure airport. A travel time from a geographical location of the computing device of the user to the departure airport is received from a navigation system. The computing device displays a time for the user to start travel to the departure airport based on the user-specific airport processing time and the travel time to the departure airport for the user to reach the departure gate by the departure time.

24 Claims, 10 Drawing Sheets

(51) Int. Cl.
*G06Q 20/34* (2012.01)
*G06Q 10/02* (2012.01)
*G06Q 50/30* (2012.01)
*G06N 20/00* (2019.01)
*G06F 3/0484* (2022.01)
*G01C 21/34* (2006.01)
*G06Q 30/0201* (2023.01)

(56) References Cited

U.S. PATENT DOCUMENTS

2007/0073562 A1\* 3/2007 Brice ................ G06Q 10/02
705/5
2016/0171546 A1\* 6/2016 Gartenberg ........ G06Q 30/0261
705/14.58

\* cited by examiner

- Starting Point: 575 Any Street — 272
  Any City, USA

- Departure Airport: My Airport (MYA) — 155
  Flight No: 575 — 276
  XYZ Airlines — 278
  Departure Gate 15B at MYA — 190, 155
  Boarding Time: 4:10 PM — 280
  Departure Time: 5:00 PM — 290

- Distance to MYA: 51.5 Miles — 282

- Heavy Traffic Reported on Route 5
  Delay of 37 Minutes — 285

- Time to Leave 575 Any Street — 272
  To Arrive at Gate 15B At MYA — 155
  At 4:10 PM By: — 190
  280
  Car: 2:43 PM — 292
  Bus: 1:58 PM — 294
  Train: 2:55 PM — 296
  Motorcycle: 3:10 PM — 298

FIG. 4

COMPUTER-BASED SYSTEMS FOR DETERMINING A TRAVEL TIME TO AN AIRPORT DEPARTURE POINT AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to computing systems and more specifically to computer-based systems for determining a travel time to an airport departure point and methods of use thereof.

BACKGROUND OF TECHNOLOGY

A computer network platform/system may include a group of computers (e.g., clients, servers, smart routers) and other computing hardware devices that are linked together through one or more communication channels to facilitate communication and/or resource-sharing, via one or more specifically programmed graphical user interfaces (GUIs) of the present disclosure, among a wide range of users.

SUMMARY OF DESCRIBED SUBJECT MATTER

In some embodiments, the present disclosure provides an exemplary technically improved computer-based method that includes at least the following steps of identifying, by a processor of a server managed by an authorizing entity, departing flight information in payment card transaction data from a plurality of users using payment cards issued by the authorizing entity. The departing flight information may designate a departure airport and a departure time. A geographical location of the computing device of the user may be received, by the processor, in real-time over a communication network, from a computing device of a user from the plurality of users. Airport-specific data for a departure airport in a predefined time interval before a departure time of a departing flight of the user may be received, by the processor, in real-time over the communication network. The airport-specific data may include at least:
 (i) the departing flight information at the departure airport of the departing flight of the user,
 (ii) real-time flight information of arriving and departing flights at the departure airport,
 (iii) payment card transaction data of other users from the plurality of users received by the server from a plurality of point-of-sale (POS) devices at the departure airport in the predefined time interval before the departure time of the user,
 (iv) transportation security administration (TSA) waiting times in the departure airport in the predefined time interval before the departure time of the user;

The airport-specific data may be inputted, by the processor, in real-time, into at least one machine learning model. A user-specific airport processing time for the user to reach a departure gate within the departure airport by the departure time of the departing flight upon the user arriving to the departure airport may be received, by the processor, in real-time, from the at least one machine learning model. The user-specific airport processing time may be based on a number of passengers in the departure airport in a predefined time interval before the departure time of the departing flight of the user to account for passenger congestion in the departure airport. The at least one machine learning model may be configured to estimate the number of passengers in the departure airport at least in part from the departing flight information identified in the payment card transaction data of other users from the plurality of users flying on flights from the departure airport in the predefined time interval before the departure time of the user. A travel time from the geographical location of the computing device to the departure airport for at least one predefined mode of transportation may be received, by the processor, in real-time over the communication network from a remote server hosting a navigation system software application. The processor may cause, in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user. The time displayed on the GUI for the user to start travel to the departure airport as the geographical location of the computing device of the user changes for each of the at least one predefined mode of transportation may be updated, by the processor, in real-time.

In some embodiments, the present disclosure provides an exemplary technically improved computer-based system that includes at least the following components of a memory for storing computer code and a processor of a server managed by an authorizing entity, that when executing the computer code, causes the processor to: identify departing flight information in payment card transaction data from a plurality of users using payment cards issued by the authorizing entity, where the departing flight information may designate a departure airport and a departure time; receive in real-time over a communication network, from a computing device of a user from the plurality of users, a geographical location of the computing device of the user; receive in real-time over the communication network, airport-specific data for a departure airport in a predefined time interval before a departure time of a departing flight of the user, where the airport-specific data may include at least:
 (i) the departing flight information at the departure airport of the departing flight of the user,
 (ii) real-time flight information of arriving and departing flights at the departure airport,
 (iii) payment card transaction data of other users from the plurality of users received by the server from a plurality of point-of-sale (POS) devices at the departure airport in the predefined time interval before the departure time of the user,
 (iv) transportation security administration (TSA) waiting times in the departure airport in the predefined time interval before the departure time of the user;
input, in real-time, the airport-specific data into at least one machine learning model; receive, in real-time, from the at least one machine learning model, a user-specific airport processing time for the user to reach a departure gate within the departure airport by the departure time of the departing flight upon the user arriving to the departure airport, where the user-specific airport processing time is based on a number of passengers in the departure airport in a predefined time interval before the departure time of the departing flight of the user to account for passenger congestion in the departure airport, where the at least one machine learning model is configured to estimate the number of passengers in the departure airport at least in part from the departing flight information identified in the payment card transaction data of other users from the plurality of users flying on flights from the departure airport in the predefined time interval before the departure time of the user; receive, in real-time over the communication network from a remote server hosting a navigation system software application, a travel time from the geographical location of the computing device to the departure airport for at least one predefined mode of transportation; cause in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user; and update in real-time, the time displayed on the GUI for the user to start travel to the departure airport as the geographical location of the computing device of the user changes for each of the at least one predefined mode of transportation.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 4 is a screenshot of a specialized graphical user interface on a computing device of a user displaying a travel time from a geographical location to a departure gate in accordance with one or more embodiments of the present disclosure;

DETAILED DESCRIPTION

Figure 1:
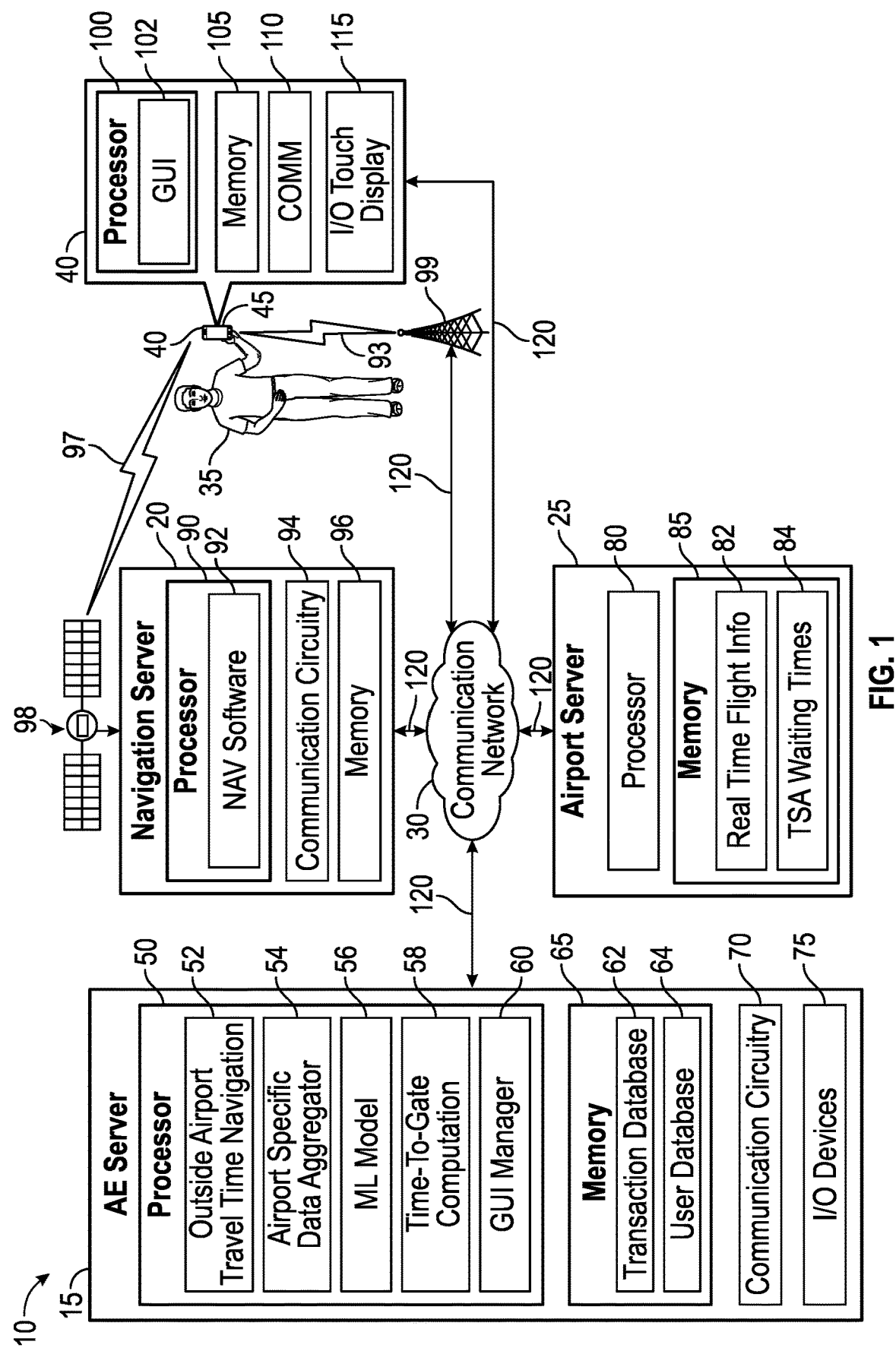
FIG. 1 shows a block diagram of an exemplary computer-based system for determining a travel time to an airport departure point in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Embodiments of the present disclosure herein disclose computer-based systems and methods for determining a travel time for a user to arrive at an airport departure point, such as an airport departure gate, from any geographical location. An authorizing entity (AE) server managed by an authorizing entity may compute a travel time to an airport departure gate based on a navigation system to assess the time for a user to arrive to a departure airport from any geographical location, and a user-specific airport processing time that the user may need to traverse the queues within the airport to the departure gate upon arrival to the airport terminal.

In some embodiments, the AE server may use a machine learning model to compute the user-specific airport processing time by assessing the impact of crowd congestion within the airport terminal. The AE server may assess the impact of crowd congestion by using departing flight information in payment card transactions from a plurality of users using payment cards (e.g., credit cards and/or debit cards) issued by the authorizing entity. For example, the AE server may use the departing flight information to assess a number of users leaving on flights departing from a same departure airport at substantially the same time to estimate the crowd congestion. The AE server may then cause to display a time that the user should leaving the geographical location on at least one predefined mode of transportation so as to arrive at the departure gate in time for the user's departing flight.

The exemplary embodiments disclosed herein provide a novel technical solution where an authorizing entity may directly inform a user taking a flight from a particular departure airport as to the estimated processing time to the departure gate that the user will experience upon arrival to the departure airport due to various security checkpoints and/or check-in lines and/or baggage check stations with the airport terminal. The user-specific airport processing time may be based, in part, on the airport's passenger congestion (e.g., a number of passengers in the airport) in a predefined time interval before the user's flight.

More specifically, the exemplary embodiments herein leverage the use of payment card transactions typically available to the authorizing entity to identify for departing flight information in purchase card transaction data of a plurality of users. The departing flight information may be used to identify a number of other users from the plurality of users also using payment cards issued by the authorizing entity that will be in a particular departure airport at substantially the same time as a particular user to estimate, in part passenger congestion that the particular user will experience.

In some embodiments, airport-specific data may use the number of other users travelling substantially at the same time as the particular user estimated from the payment card transactions in addition to real time flight information at the airport, security line wait times, and real-time payment card transaction data of the other users at merchants within the airport terminal. All of this information may be input into at least one trained machine learning (ML) model to output a user-specific airport processing time of the particular user as the particular user traverse the airport terminal from the entrance to the particular user's departure gate.

In some embodiments, the user-specific airport processing time of the particular user may be combined with a travel time from the user's starting location to the departure gate at the departure airport to compute the time that the user needs to leave the geographical location (e.g., starting point) to arrive at the departure gate in time for the user's departing flight.

FIG. 1 shows a block diagram of an exemplary computer-based system 10 for determining a travel time to an airport departure point in accordance with one or more embodiments of the present disclosure. The system 10 may include an authorizing entity (AE) server 15, a navigation server 20 communicating with a navigation satellite 98, an airport server 25, and a user 35 with a computing device 40 on which a graphical user interface 45 is displayed on a display of the computing device 40. The graphical user interface 45 may be generated by a software application that may be issued by the authorizing entity and may be running on the computing device 40 (e.g., displayed on the display of the user's computing device 40). The computing device 40 may communicate 93 with a cellular basestation 99 and/or may communicate 97 with the navigation satellite 98, such as a satellite of a global positioning system (GPS), for example. The AE server 15, the navigation server 20, the airport server 25, and/or the computing device 40 of the user 35 via the cellular basestation 99 may communicate 120 over a communication network 30.

In some embodiments, the AE server 15 may include a processor 50, a non-transitory memory 65, communication circuitry 70 for allowing the AE server 15 to communicate 120 over the communication network 30, and input/output (I/O) devices 75. The input/output (I/O) devices 75 may include a mouse, a CD-ROM, DVD, a physical or virtual keyboard, a display, a speaker, touchscreen, and/or any other input or output devices. The processor 50 may be configured to execute software modules such as an Outside Airport Travel Time Navigation 52 module, an airport specific data aggregator 54 module, a machine learning (ML) model module 56, a time-to-gate computation module 58, and/or a graphical user interface (GUI) manager 60. Memory 65 may store a plurality of payment card transactions of a plurality of users using payment cards issued by the authorizing entity. The plurality of payment card transactions and information about the plurality of users may be stored in memory 65 respectively in a transaction database 62 and a user database 64 that are managed by the authorizing entity.

In some embodiments, the authorizing entity may be a financial institution, a bank, a credit card company, corporation, partnership, limited partnership, limited liability company, for example.

In some embodiments, the computing device 40 of the user 35 may include a processor 100, a memory 105, input/output devices 115 such as a touch display, and communication circuitry 110 for communicating with the cellular basestation 99 and/or for communicating 97 with the navigation satellite 98, such as the satellite of the global positioning system (GPS), for example. In other embodiments, communication circuitry 110 may communicate 120 over the communication network 30 such as through Wi-Fi, for example, or any other suitable communication protocol.

In some embodiments, the navigation server 20 may include a processor 90, communication circuitry 94 for allowing the navigation server 20 to communicate 120 over the communication network 30, and a memory 96. The processor 90 may be configured to execute software applications such as a navigation system software application 92 (e.g., NAV software 92) which may be used to detect a geographical location of the computing device 40 of the user 35, for example, and compute a travel time from a first geographical location of the computing device 40 to a second geographical location, or a point of interest, such as a departure airport, for example, based on detected traffic congestion for at least one predefined mode of transportation (e.g., car, bus, train, motorcycle, and/or a bicycle).

In some embodiments, the airport server 25 may include a processor 80 and a memory 85 in addition to communication circuitry and I/O devices (not shown). The airport server 25, typically located at an airport, may be used to monitor and store real-time flight departure and/or arrivals to the airport and to store them in the memory 85 in a real-time flight information database 82. The airport server 25 may be used to monitor and store airport security waiting times such as Transportation Security Administration (TSA) waiting times, for example, in the airport and to store them in the memory 85 in a TSA waiting time database 84.

Figure 2:
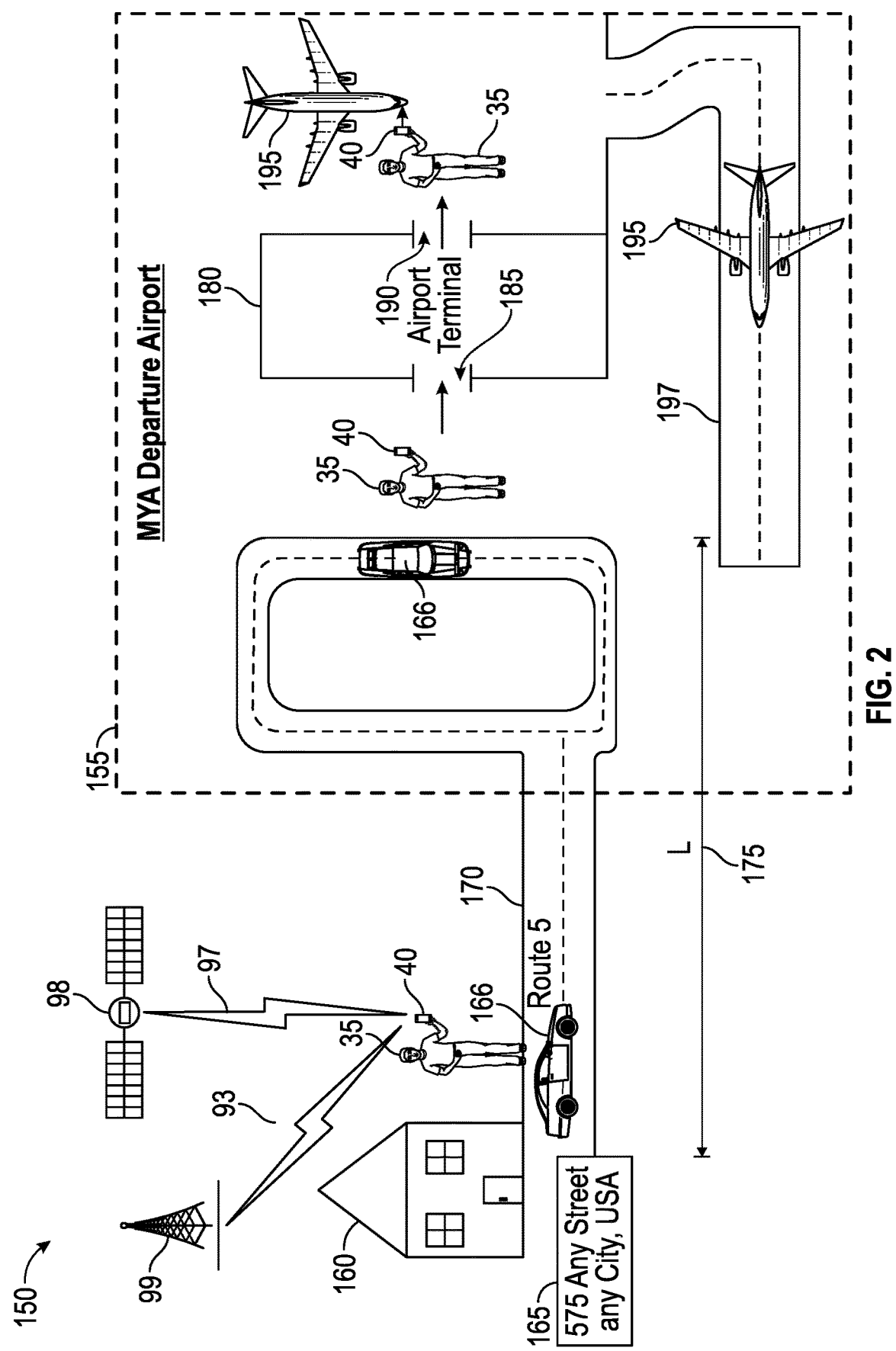
FIG. 2 is a diagram showing a user departing from a geographical location to a departure airport in accordance with one or more embodiments of the present disclosure.

FIG. 2 is a diagram 150 showing the user 35 departing from a geographical location 165 to a departure airport 155 in accordance with one or more embodiments of the present disclosure. The geographical location 165 is identified as a house 160 located at 575 Any Street, Any City, USA. A departure airport 155 (e.g., denoted with exemplary airport code MYA) may include an airport terminal 180 with an entrance 185, a departure gate 190 for the user 35 to board an airplane 195, and a runway 197 for airplanes to take off and land.

The user 35 may need to travel to the departure airport 155 to take a departing flight. The computing device 40 of the user 35 may identify the geographical location 165 through a navigation application running on the computing device 40. The navigation application may communicate 97 with navigation satellite 98 and the NAV software 92 running on the navigation server 20. The NAV software 92 may assess that a distance 175 denoted L that the user 35 needs to travel from the geographical location 165 to the location of an entrance 185 of an airport terminal 180 at the departure airport 155 via a highway 170 denoted Route 5, for example. In some embodiments, the user 35 may use a car 166 to travel from the house 160 to the entrance 185 of the airport terminal 180 at the departure airport 155.

In some embodiments, the NAV software 92 may compute the travel time that the user 35 may need in travelling from the geographical location 165 to the location of the entrance 185 to the airport terminal 180 based on current traffic conditions for the for at least one predefined mode of transportation. This computed travel time for the for at least one predefined mode of transportation from the navigation server 20 may be sent to the Outside Airport Travel Time Navigation 82 module over the communication network 30.

Figure 3:
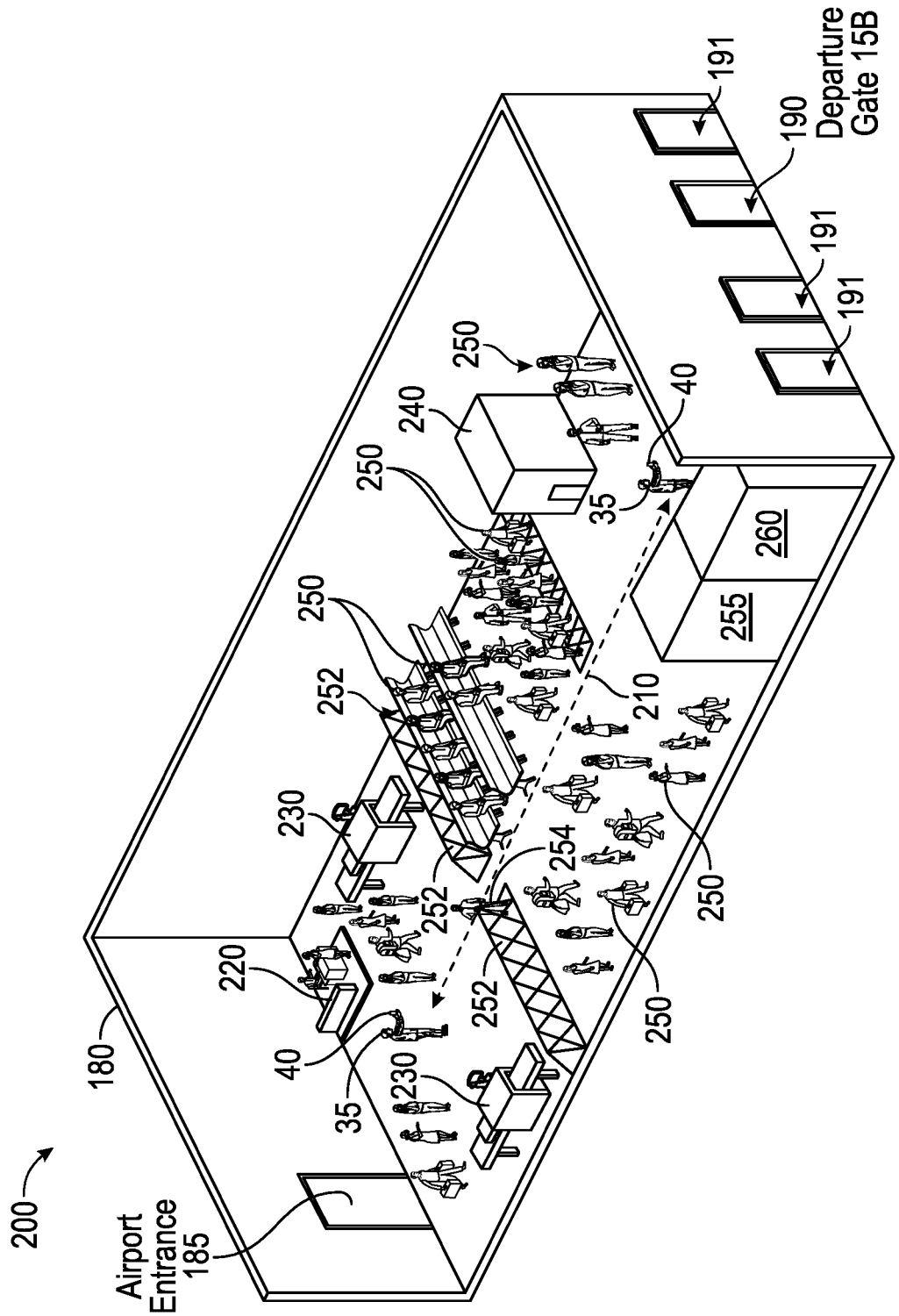
FIG. 3 is a diagram showing a user inside a departure terminal arriving at a departure gate in accordance with one or more embodiments of the present disclosure.

FIG. 3 is a diagram 200 showing the user 35 inside the airport terminal 180 arriving at the departure gate 190 in accordance with one or more embodiments of the present disclosure. The user 35 may enter the entrance 185 of the airport terminal 180. The user 35 may need to check baggage and/or receive a boarding pass at a flight check-in counter 220 to board a flight that leaves, for example, on the opposite side of the airport terminal 180 from the departure gate 190 denoted GATE 15B. The user 35 may need to have handbags scanned at security scanners 230.

The user 35 may then pass a security barrier 252 and a security guard 254 into the passenger waiting area with departure gates 191 and the user's departure gate 190 (e.g., GATE 15B). The user 35 may wait in a lounge 240, may shop in a shop 255, and/or may eat in a restaurant 260 within the airport terminal 180.

In some embodiments, upon entering the airport terminal 180 at the airport entrance 185, the user 35 may need to check bags, to pass through security checks, and to traverse the airport terminal 180 to the departure gate 190 along an exemplary path 210 through the check-in stations and/or security checkpoints as shown within the airport terminal 180. When the airport terminal 180 is not-crowded, there may be a nominal user-specific airport processing time $tp_{nom}$ that the user 35 may need to traverse the terminal along the exemplary path 210 from the entrance 185 to the departure gate 190. However, when there are a lot of passengers 250 waiting on security lines, check-in lines, baggage check lines and/or in line at gates waiting for connecting and/or departing flights, a user-specific airport processing time tp may be much longer to the user 35 to traverse the terminal along the same exemplary path 210, where tp may be much larger than $tp_{nom}$ (e.g., $tp >> tp_{nom}$).

In some embodiments, determining the user-specific airport processing time for the user 35 in a predefined time interval before the departure time or boarding time of the user's departing flight (e.g., at GATE 15B) depends on airport-specific data based in part, on an estimate of a number of passengers in the airport terminal 180 and/or on known wait times at the different security checkpoints and/or check-in station for estimating passenger congestion in the predefined time interval, such 1-3 hours, for example, before the departure time or boarding time of the user's departing flight.

In some embodiments, the AE server 15 may identify departing flight information in payment card transaction data stored in transaction database 62 from the plurality of users (e.g., from user database 64) using payment cards issued by the authorizing entity. The departing flight information may designate a departure airport and a departure time. Thus, flight information by users from the plurality of users that paid for flight tickets, for example, using a payment card issued by the authorizing entity may be identified in payment card transaction data for determining a number of passengers that will be in the departure airport 155 of the user 35 in the predefined time interval before the user's departing flight. For example, the processor 50 may determine the number of passengers in the airport terminal in the predefined time interval from the number of users using the payment card issued by the authorizing entity by assuming a scaling coefficient such that 30-35%, for example, of the passengers in the terminal used the payment card issued by the authorizing entity to pay for their flight tickets that will be in the departure airport 155 of the user 35 in the predefined time interval.

In some embodiments, the scaling coefficient may be obtained, for example, by comparing payment card transaction data from the payment card issued by the authorizing entity to that of other payment cards issued by other authorizing entities. In other embodiments, the scaling coefficient may be obtained by comparing payment card transaction data to historical data of the number of passengers data in a particular airport at a particular date and time.

In some embodiments, the payment card transaction data may indicate whether additional baggage was purchased which may be indicative of further delays by any of the passengers may incur at baggage check lines in the airport terminal 180.

In some embodiments, the user-specific airport processing time may be assessed, in part, from airport-specific data such as, for example, on the departing flight information at the departure airport of the departing flight of the user, real-time flight information of arriving and departing flights at the departure airport, payment card transaction data of other users from the plurality of users received by the server from a plurality of point-of-sale (POS) devices at the departure airport in the predefined time interval before the departure time of the user, and/or transportation security administration (TSA) waiting times in the departure airport in the predefined time interval before the departure time of the user.

In some embodiments, the real-time flight information of the arriving and departing flights at the departure airport may include at least 25 flights.

In some embodiments, the airport-specific data in the predefined time interval may further include: wait time information in response to push notifications to any of the plurality of users in the departure airport, flight price data, number of seats left on flights, a number of passengers in the departure airport identified from mobile device location tracking data, a number of users from the plurality of users checking baggage, shared passenger capacity data from public transportation servers, airport lounge data, or any combination thereof.

The processor 50 may use the airport specific data aggregator 54 module to generate the airport-specific data by analyzing terabytes of data of payment card transaction data and data from different data sources used to generate the airport-specific data as stated above. Thus, the airport-specific data may be indicative of passenger congestion in the terminal and may be used to compute the user-specific airport processing time as described below.

In some embodiments, the user-specific airport processing time may be calculated, or outputted, from at least one machine learning model (e.g., ML Model 56) where the airport-specific data is inputted to the at least one machine learning model.

In some embodiments, the at least one machine learning model may be configured to estimate the number of passengers in the departure airport at least, in part, from the departing flight information identified in the payment card transaction data of other users from the plurality of users flying on flights from the departure airport 155 in the predefined time interval before the departure time of the user 35.

In some embodiments, the at least one machine learning model may be trained by the processor 50 inputting the airport-specific data for any of the plurality of users flying on flights from any departure airport to the at least one machine learning model, and comparing user-specific airport processing times outputted by the at least one machine learning model to historical airport capacity data from airport websites, government websites, airline websites, or any combination thereof. For example, Federal Aviation Group, for example, publishes daily historical flight data across all U.S. airports.

In some embodiments, the at least one machine learning model may be trained using data that may be retrieved through use of an Application Programming Interface (API) with third party databases such as an Enterprise Management Incentive (EMI) API. EMI API may identify an airport, and/or an itinerary, for example, from the payment card transaction data. The EMI API may be executed by the processor 50 of the AE server 15. The EMI API may be triggered when flight information may be identified in payment card transaction data. The identified flight information may be placed in the transaction database 62 and/or may be stored in a separate database with only the identified flight information for any of the plurality of users from their payment card transaction data.

In some embodiments, ridesharing data from historical Uber and/or Lyft transactions, for example, indicating transportation to airports may be used to assess the number of passengers in the airport terminal 180 of the departure airport 155 in the predefined time interval. Moreover, the AE server 15 may share processing time data of any users from the plurality of users indicative of passenger congestion in the airport terminal 180 of the departure airport 155 with ridesharing companies and/or taxi companies to indicate to those companies of large passenger congestion times and the need for more taxi and/or ridesharing drivers during the estimated peak congestion times.

In some embodiments, processor 50 may transmit in real-time over the communication network 30, to other servers managed by public transportation companies, navigation systems, or both, the user-specific airport processing time at the departure airport 155.

In some embodiments, once the processor 50 computes the user-specific airport processing time for traversing the airport terminal 180 to the departure gate 190 (e.g., along the exemplary path 210) and receives the computed travel time from the navigation server 20 that the user 35 may need in travelling from the geographical location 165 to the location of the entrance 185 to the airport terminal 180 for the at least one predefined mode of transportation, this data may by inputted to time-to-gate computation module 58. Time-to-gate computation module 58 may compute the total time for the user 35 to travel from the geographical location 165 to the departure gate 190 using the at least one predefined mode of transportation to the airport.

In some embodiments, GUI manager 60 may cause over the communication network 30, to display on the GUI 45 of the user's computing device 40, the time that the user 35 needs to depart from the geographical location for the departure airport 155 so as to arrive at the departure gate 190 to be in time for the user's flight. This displayed time may be updated in real-time as a position of the user's computing device 40 changes or the user 35 may stop en-route to the departure airport 155. Thus, the processor 50 may update in real-time, the time displayed on the GUI for the user to start travel to the departure airport as the geographical location of the computing device of the user changes for each of the at least one predefined mode of transportation.

In some embodiments, the processor 50 may further cause in real-time, to display on the GUI 45 at least one recommendation to the user as to which of the at least one predefined mode of transportation to use that will enable the user to arrive at the departure gate in time for the departing flight.

FIG. 4 is an exemplary screenshot 270 of the graphical user interface 45 on the computing device 40 of the user 35 displaying a travel time from a geographical location to a departure gate in accordance with one or more embodiments of the present disclosure. GUI 45 may be managed by the GUI manager 60 of the AE server 15. GUI 45 may display a starting point 272 of the user 35, the departure airport 155 (MYA=My Airport), a flight number 276 of the user's upcoming flight, the departure gate 190, a boarding time 280 for the flight, a departure time 290 for the flight, a distance 282 to the departure airport, traffic alerts 285 enroute to the departure airport indicating delays, and/or a time for the user 35 to leave the starting point 272 (e.g., the geographical location detected by the navigation system) to arrive at the user's departure gate 190 by the boarding time 280. For example, the starting point 272 (e.g., first geographical location) may be the address of the user's house 160. The time to leave the starting point 272 may be given for transportation to the departure airport 155 by different predefined modes of transportation: a time to leave by a car 292, a time to leave by a bus 294, a time to leave by a train 296, and a time to leave by a motorcycle 298.

In some embodiments, the processor 50 may receive in real-time over the communication network 30 from the computing device 40, a user-chosen mode of transportation from the at least one predefined mode of transportation. The processor 50 may cause in real-time over the communication network, to display on the GUI 45, a navigation map based on the user-chosen mode of transportation to guide the user 35 from the geographical location 165 of the computing device 40 to the departure gate 190.

The embodiments shown in FIGS. 2-4 are merely for visual clarity and not by way of limitation of the embodiments disclosed herein. For example, the user's computing device 40 may be configured to show the starting point location as from any geographic location which may be dynamically updated as the user travels to the departure airport 155. The GUI 45 may display any suitable information for informing the user 35 as to the time to arrive at the departure gate from the current location and/or for each of the at least one predefined mode of transportation.

In some embodiments, processor 50 may send push notifications to computing devices (e.g., cellphones, tablets) of users identified by AE server 15 as being located at the departure airport 155 with questions regarding real-time feedback such as "How long did you wait at the security checkpoint, check-in lines, and/or the baggage check lines?" The users may enter their answers into the graphical user interface of their which may be sent to the Airport Specific Data Aggregator 54 over the communication network 30.

In some embodiments, processor 50 may input flight price data and/or flight seat occupancy data to the at least one machine learning model (e.g., ML model 56) to assess if a flight is full, which may be indicative of more passenger congestion in the airport terminal 180.

In some embodiments, the software application issued by the authorizing entity that is running on the computing device 40 of the user 35 or other users that may be customers of the authorizing entity may use location tracking services. The location tracking services may be used to report the location of each of the computing devices of all of the users associated with authorizing entity to the airport specific data aggregator 54 module on AE server 15. This may be used in part to determine the number of customers of the authorizing entity physically located in airport terminal 180 and/or the time that the passengers stand in queues.

In some embodiments, processor 50 may cluster purchase card transaction data in transaction database 62 into classification groups: one group having transactions with main flight information and another group having transactions with auxiliary data for identifying passenger congestion such as baggage payments, payments to ride sharing applications to the departure airport 155 on a given date, transactions related to lounge 240, transactions related to digital lounges such as food vouchers in restaurants 260, or any combination thereof.

In some embodiments, the at least one machine learning model (ML model 56) may include an unsupervised machine learning model for clustering the users, flight information, and any other suitable parameter, for example, indicative of passenger congestion. In other embodiments, processor 50 may use statistical models for computing standard deviations of wait times, for example through the various check-in stations and/or security checkpoints within the airport terminal 180.

Figure 5:
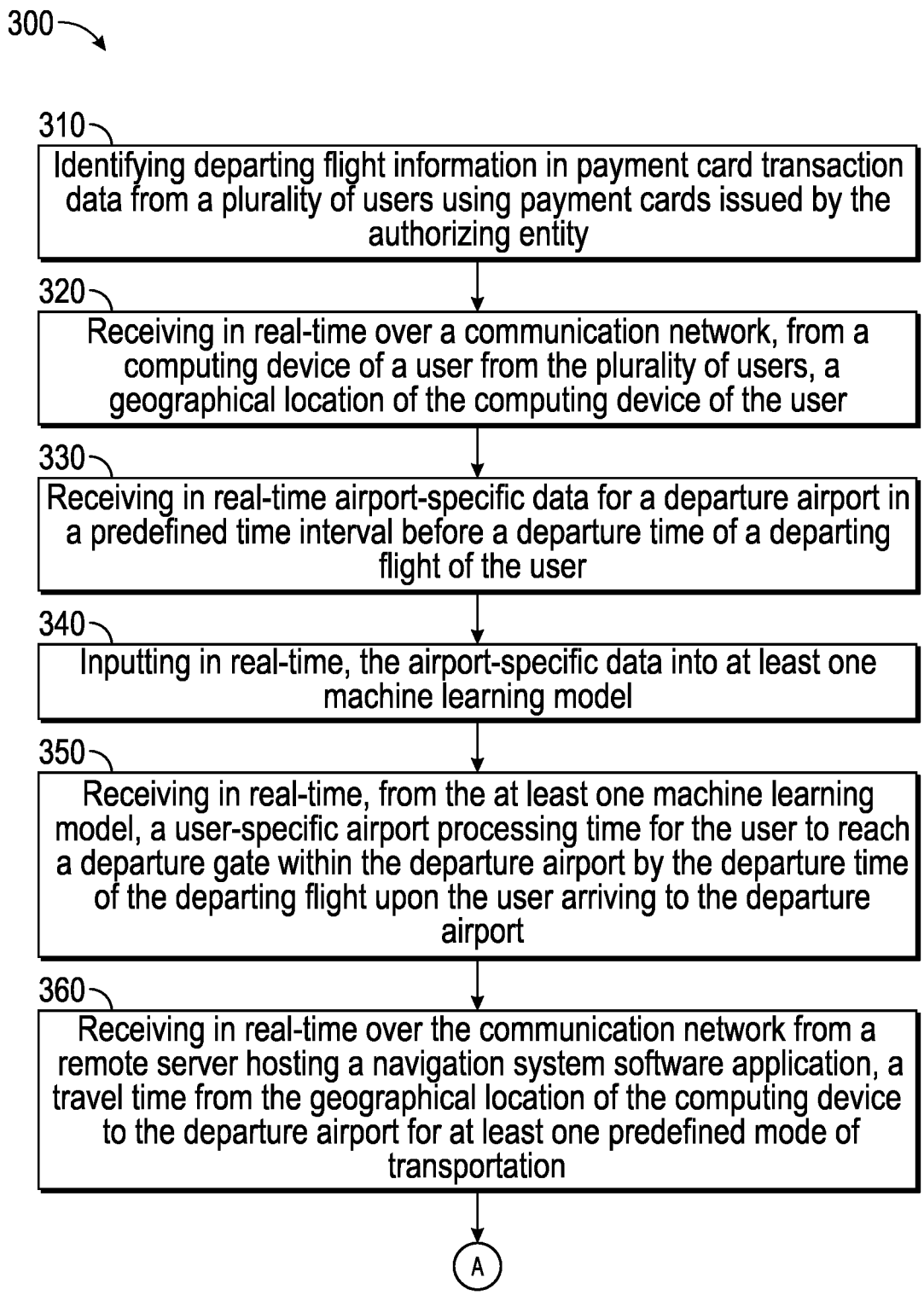
FIG. 5 is a flowchart of a computer-based method for determining a travel time from a geographical location to a departure gate in accordance with one or more embodiments of the present disclosure.
Figure 5:
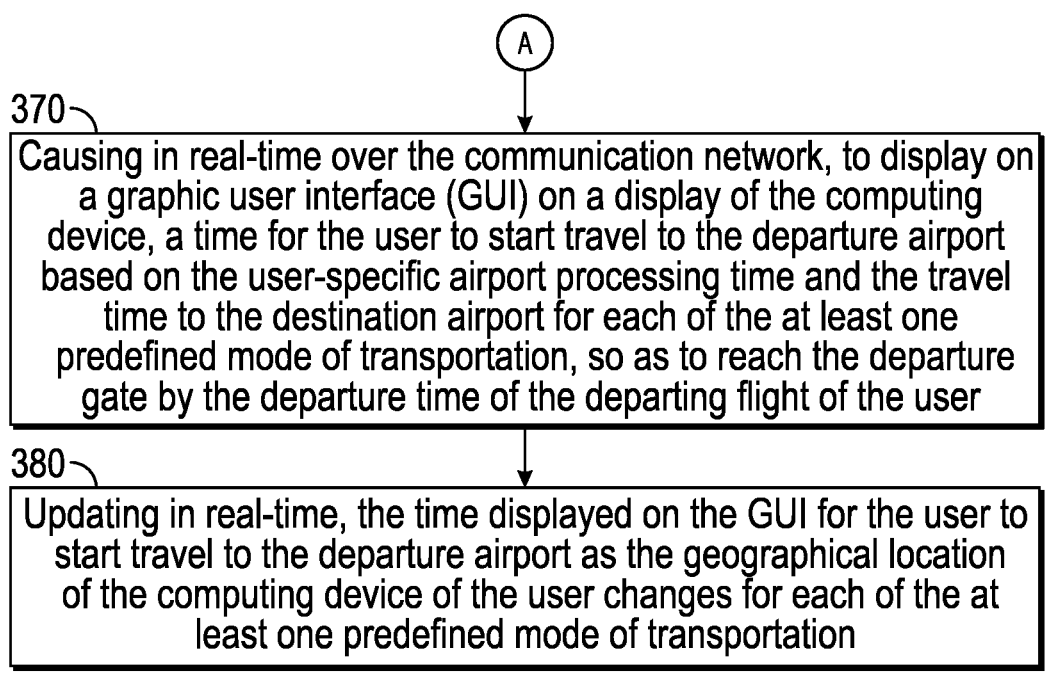

FIG. 5 illustrates a flowchart of a computer-based method 300 for determining a travel time from a geographical location to an airport departure gate in accordance with one or more embodiments of the present disclosure. Method 300 may be performed by processor 50 of AE server 15.

Method 300 may include identifying 310 departing flight information in payment card transaction data from a plurality of users using payment cards issued by the authorizing entity.

Method 300 may include receiving 320 in real-time over a communication network, from a computing device of a user from the plurality of users, a geographical location of the computing device of the user.

Method 300 may include receiving 330 in real-time airport-specific data for a departure airport in a predefined time interval before a departure time of a departing flight of the user.

Method 300 may include inputting 340 in real-time, the airport-specific data into at least one machine learning model.

Method 300 may include receiving 350 in real-time, from the at least one machine learning model, a user-specific airport processing time for the user to reach a departure gate within the departure airport by the departure time of the departing flight upon the user arriving to the departure airport.

Method 300 may include receiving 360 in real-time over the communication network from a remote server hosting a navigation system software application, a travel time from the geographical location of the computing device to the departure airport for at least one predefined mode of transportation.

Method 300 may include causing 370 in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user.

Method 300 may include updating 380 in real-time, the time displayed on the GUI for the user to start travel to the departure airport as the geographical location of the computing device of the user changes for each of the at least one predefined mode of transportation.

The embodiments disclosed herein are not limited to computing travel times and passenger processing times inside airports using payment card transaction data but also may be applied to cultural and/or sporting events. The AE server 15 may be used to identify users using payment cards from an authorizing entity and the payment card transaction data may be searched to identify transactions having cultural and/or sporting event information. The cultural and/or sporting event information may then be used to assess the number of people entering a stadium, arena, theater, and/or concert hall, for example to assess the processing time for a user to reach a seat in the stadium, arena, theater, and/or concert hall for the cultural and/or sporting event.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s.

In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 6:
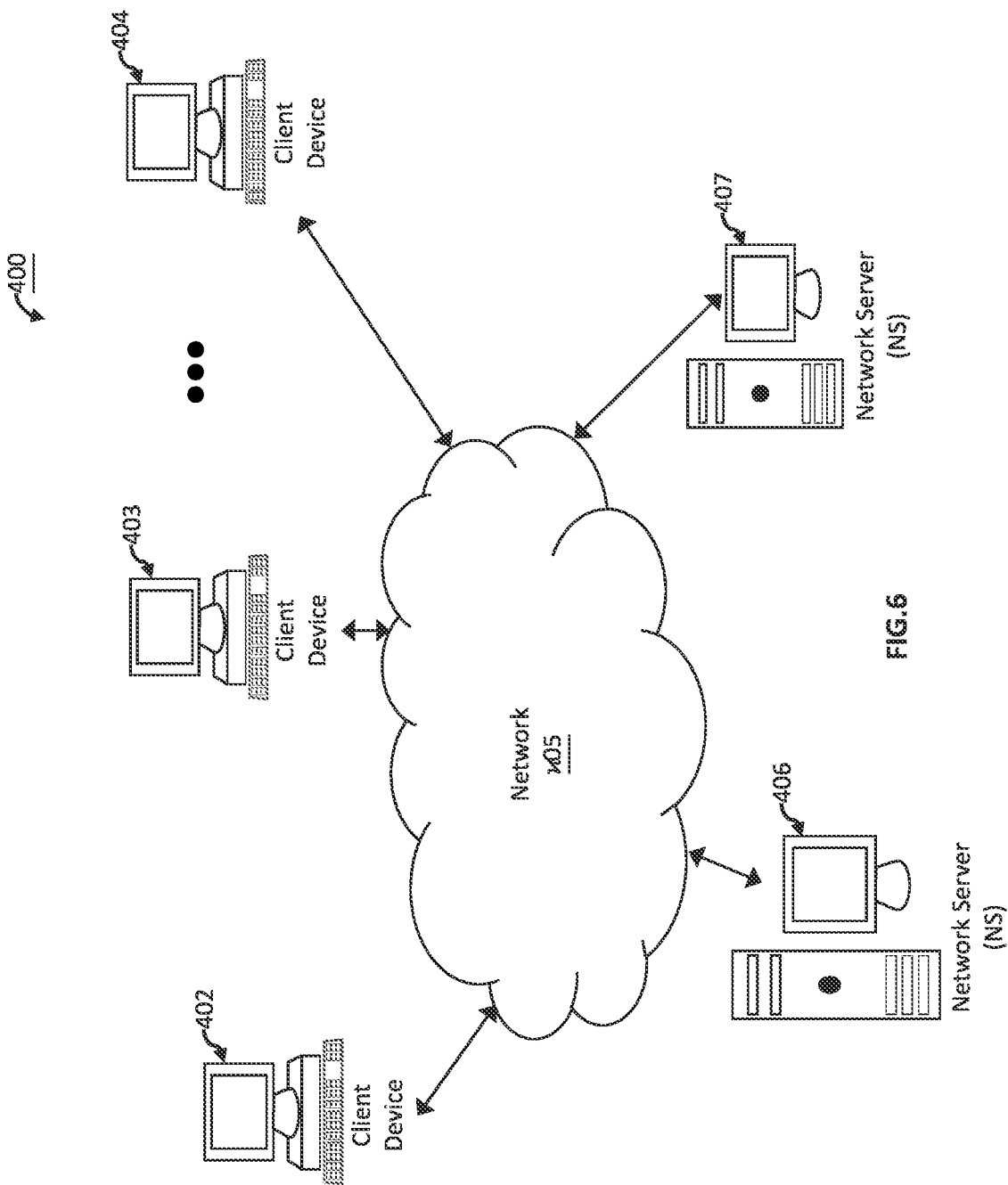
FIG. 6 depicts a block diagram of an exemplary computer-based system/platform in accordance with one or more embodiments of the present disclosure.

FIG. 6 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 6, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
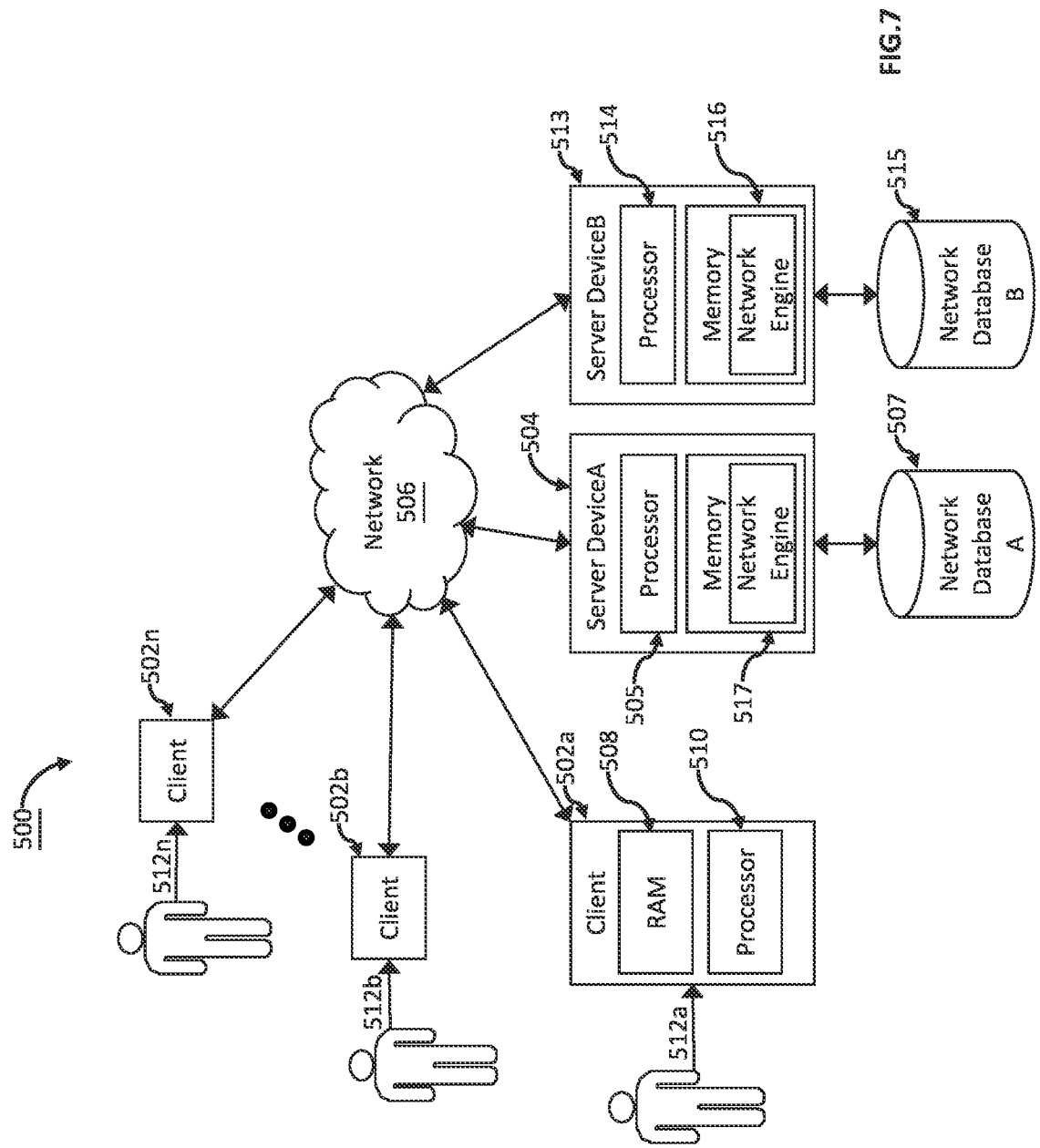
FIG. 7 depicts a block diagram of another exemplary computer-based system/platform in accordance with one or more embodiments of the present disclosure.

FIG. 7 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 7, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
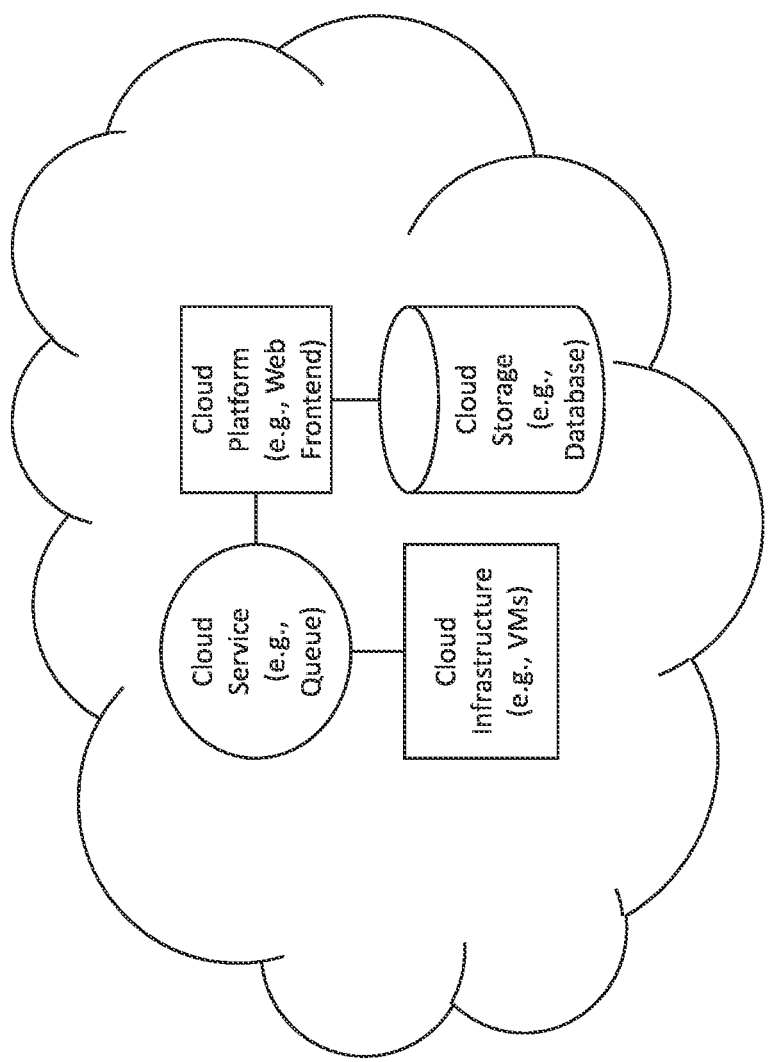
FIGS. 8 and 9 are diagrams illustrating implementations of cloud computing architecture/aspects with respect to which the disclosed technology may be specifically configured to operate, in accordance with one or more embodiments of the present disclosure.
Figure 9:
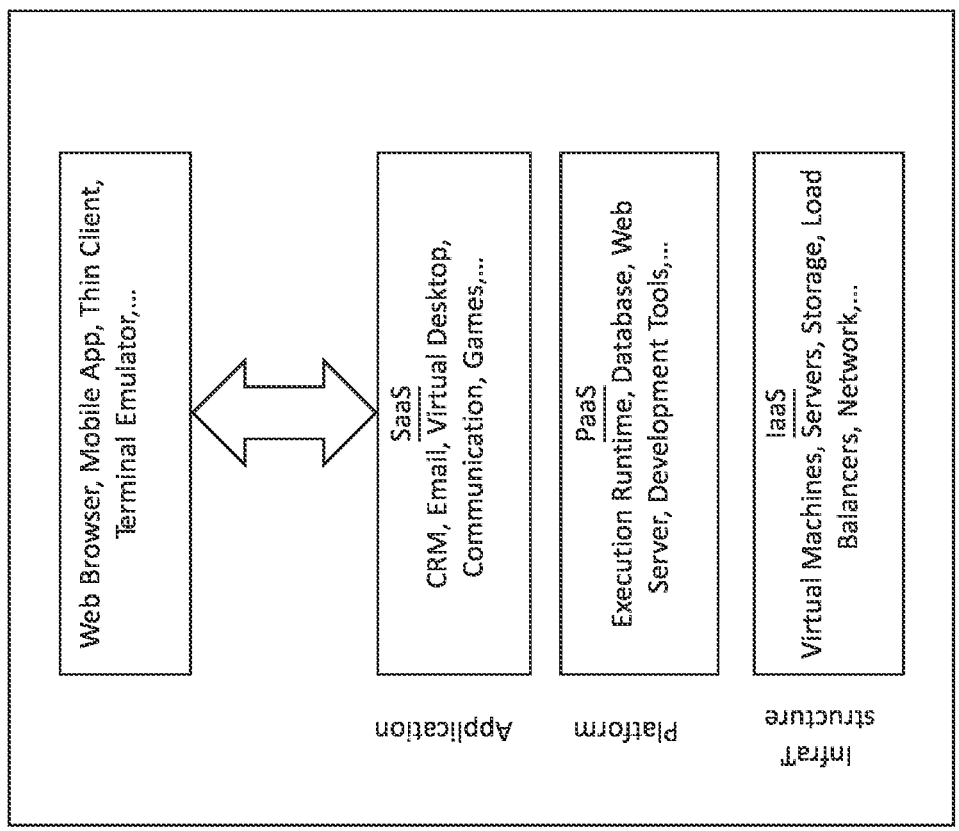

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
   identifying, by a processor of a server managed by an authorizing entity, departing flight information in payment card transaction data from a plurality of users using payment cards issued by the authorizing entity;
   where the departing flight information may designate a departure airport and a departure time;
   receiving, by the processor, in real-time over a communication network, from a computing device of a user from the plurality of users, a geographical location of the computing device of the user;
   receiving, by the processor, in real-time over the communication network, airport-specific data for a departure airport in a predefined time interval before a departure time of a departing flight of the user;
   where the airport-specific data may include at least:
   (i) the departing flight information at the departure airport of the departing flight of the user,
   (ii) real-time flight information of arriving and departing flights at the departure airport,
   (iii) payment card transaction data of other users from the plurality of users received by the server from a plurality of point-of-sale (POS) devices at the departure airport in the predefined time interval before the departure time of the user, and
   (iv) transportation security administration (TSA) waiting times in the departure airport in the predefined time interval before the departure time of the user;
   inputting, by the processor, in real-time, the airport-specific data into at least one machine learning model;
   receiving, by the processor, in real-time, from the at least one machine learning model, a user-specific airport processing time for the user to reach a departure gate within the departure airport by the departure time of the departing flight upon the user arriving to the departure airport;
   where the user-specific airport processing time may be based on a number of passengers in the departure airport in a predefined time interval before the departure time of the departing flight of the user to account for passenger congestion in the departure airport;
   where the at least one machine learning model may be configured to estimate the number of passengers in the departure airport at least in part from the departing flight information identified in the payment card transaction data of other users from the plurality of users flying on flights from the departure airport in the predefined time interval before the departure time of the user;
   receiving, by the processor, in real-time over the communication network from a remote server hosting a navigation system software application, a travel time from the geographical location of the computing device to the departure airport for at least one predefined mode of transportation;
   causing, by the processor, in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user; and
   updating, by the processor, in real-time, the time displayed on the GUI for the user to start travel to the departure airport as the geographical location of the computing device of the user changes for each of the at least one predefined mode of transportation.

2. The method according to clause 1, where the at least one predefined mode of transportation may be selected from the group consisting of: a car, a train, a bus, a bicycle and a motorcycle.

3. The method according to clause 1 or 2, further including causing, by the processor, in real-time, to display on the GUI at least one recommendation to the user as to which of the at least one predefined mode of transportation to use that will enable the user to arrive at the departure gate in time for the departing flight.

4. The method according to any one of the preceding clauses, where the real-time flight information of the arriving and departing flights at the departure airport may include at least 25 flights.

5. The method according to any one of the preceding clauses, where the airport-specific data in the predefined time interval may further include: wait time information in response to push notifications to any of the plurality of users in the departure airport, flight price data, number of seats left on flights, a number of passengers in the departure airport identified from mobile device location tracking data, a number of users from the plurality of users checking baggage, shared passenger capacity data from public transportation servers, airport lounge data, or any combination thereof.

6. The method according to any one of the preceding clauses, further including training, by the processor, the at least one machine learning model by:
   (i) inputting airport-specific data for any of the plurality of users flying on flights from any departure airport to the at least one machine learning model; and
   (ii) comparing user-specific airport processing times outputted by the at least one machine learning model to historical airport capacity data from airport websites, government websites, airline websites, or any combination thereof.

7. The method according to any one of the preceding clauses, where the at least one machine learning model may be an unsupervised machine learning model.

8. The method according to any one of the preceding clauses, further including transmitting, by the processor, in real-time over the communication network, to other servers managed by public transportation companies, navigation systems, or both, the user-specific airport processing time at the departure airport.

9. The method according to any one of the preceding clauses, where the GUI of the computing device may include an application displayed on the display on the computing device of the user issued by the authorizing entity.

10. The method according to any one of the preceding clauses, further including:
    (i) receiving, by the processor, in real-time over the communication network from the computing device, a user-chosen mode of transportation from the at least one predefined mode of transportation; and
    (ii) causing, by the processor, in real-time over the communication network, to display on the GUI, a navigation map based on the user-chosen mode of transportation to guide the user from the geographical location of the computing device to the departure gate.

11. A system may include:
    a memory for storing computer code; and
    a processor of a server managed by an authorizing entity, that when executing the computer code, causes the processor to:
    identify departing flight information in payment card transaction data from a plurality of users using payment cards issued by the authorizing entity;
    where the departing flight information may designate a departure airport and a departure time;
    receive in real-time over a communication network, from a computing device of a user from the plurality of users, a geographical location of the computing device of the user;
    receive in real-time over the communication network, airport-specific data for a departure airport in a predefined time interval before a departure time of a departing flight of the user;
    where the airport-specific data may include at least:
    (i) the departing flight information at the departure airport of the departing flight of the user,
    (ii) real-time flight information of arriving and departing flights at the departure airport,
    (iii) payment card transaction data of other users from the plurality of users received by the server from a plurality of point-of-sale (POS) devices at the departure airport in the predefined time interval before the departure time of the user, and
    (iv) transportation security administration (TSA) waiting times in the departure airport in the predefined time interval before the departure time of the user;
    input, in real-time, the airport-specific data into at least one machine learning model;
    receive, in real-time, from the at least one machine learning model, a user-specific airport processing time for the user to reach a departure gate within the departure airport by the departure time of the departing flight upon the user arriving to the departure airport;
    where the user-specific airport processing time may be based on a number of passengers in the departure airport in a predefined time interval before the departure time of the departing flight of the user to account for passenger congestion in the departure airport;
    where the at least one machine learning model may be configured to estimate the number of passengers in the departure airport at least in part from the departing flight information identified in the payment card transaction data of other users from the plurality of users flying on flights from the departure airport in the predefined time interval before the departure time of the user;
    receive, in real-time over the communication network from a remote server hosting a navigation system software application, a travel time from the geographical location of the computing device to the departure airport for at least one predefined mode of transportation;
    cause in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user; and
    update in real-time, the time displayed on the GUI for the user to start travel to the departure airport as the geographical location of the computing device of the user changes for each of the at least one predefined mode of transportation.

12. The system according to clause 11, where the at least one predefined mode of transportation may be selected from the group consisting of: a car, a train, a bus, a bicycle and a motorcycle.

13. The system according to clauses 11 or 12, where the processor may be further configured to cause in real-time, to display on the GUI at least one recommendation to the user as to which of the at least one predefined mode of transportation to use that will enable the user to arrive at the departure gate in time for the departing flight.

14. The system according to any one of clauses 11, 12, or 13, where the real-time flight information of the arriving and departing flights at the departure airport may include at least 25 flights.

15. The system according to any one of clauses 11, 12, 13 or 14, where the airport-specific data in the predefined time interval may further include: wait time information in response to push notifications to any of the plurality of users in the departure airport, flight price data, number of seats left on flights, a number of passengers in the departure airport identified from mobile device location tracking data, a number of users from the plurality of users checking baggage, shared passenger capacity data from public transportation servers, airport lounge data, or any combination thereof.

16. The system according to any one of clauses 11, 12, 13, 14 or 15, where the processor may be further configured to train the at least one machine learning model by:
    (i) inputting airport-specific data for any of the plurality of users flying on flights from any departure airport to the at least one machine learning model; and
    (ii) comparing user-specific airport processing times outputted by the at least one machine learning model to historical airport capacity data from airport websites, government websites, airline websites, or any combination thereof.

17. The system according to any one of clauses 11, 12, 13, 14, 15 or 16, where the at least one machine learning model may be an unsupervised machine learning model.

18. The system according to any one of clauses 11, 12, 13, 14, 15, 16 or 17, where the processor may be further configured to transmit in real-time over the communication network, to other servers managed by public transportation companies, navigation systems, or both, the user-specific airport processing time at the departure airport.

19. The system according to any one of clauses 11, 12, 13, 14, 15, 16, 17 or 18, where the GUI of the computing device may include an application displayed on the display on the computing device of the user issued by the authorizing entity.

20. The system according to any one of clauses 11, 12, 13, 14, 15, 16, 17, 18 or 19, where the processor may be further configured to:
    (i) receive, in real-time over the communication network from the computing device, a user-chosen mode of transportation from the at least one predefined mode of transportation; and
    (ii) cause in real-time over the communication network, to display on the GUI, a navigation map based on the user-chosen mode of transportation to guide the user from the geographical location of the computing device to the departure gate.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method, comprising:
    identifying, by a processor of a server managed by an authorizing entity, departing flight information in payment card transaction data from a plurality of users using payment cards issued by the authorizing entity;
    wherein the departing flight information designates a departure airport and a departure time;
    receiving, by the processor, in real-time over a communication network, from a computing device of a user from the plurality of users, a geographical location of the computing device of the user;
    receiving, by the processor, in real-time over the communication network, airport-specific data for a departure airport in a predefined time interval before a departure time of a departing flight of the user;
    wherein the airport-specific data comprises at least:
        (i) the departing flight information at the departure airport of the departing flight of the user,
        (ii) real-time flight information of arriving and departing flights at the departure airport,
        (iii) payment card transaction data of other users from the plurality of users received by the server from a plurality of point-of-sale (POS) devices at the departure airport in the predefined time interval before the departure time of the user, and
        (iv) transportation security administration (TSA) waiting times in the departure airport in the predefined time interval before the departure time of the user;
    utilizing, by the processor, in real-time, based on the airport-specific data, at least one machine learning model to obtain a user-specific airport processing time for the user to reach a departure gate within the departure airport by the departure time of the departing flight upon the user arriving to the departure airport;
    wherein the user-specific airport processing time is based on a number of passengers in the departure airport in a predefined time interval before the departure time of the departing flight of the user to account for passenger congestion in the departure airport;
    wherein the at least one machine learning model is configured to estimate the number of passengers in the departure airport at least in part from the departing flight information identified in the payment card transaction data of other users from the plurality of users flying on flights from the departure airport in the predefined time interval before the departure time of the user;
    placing, by the processor, in real-time over the communication network, an application software interface call to a navigation system software application to obtain a travel time from the geographical location of the computing device to the departure airport for at least one predefined mode of transportation;
    instructing, by the processor, in real-time over the communication network, the computing device to display on a graphical user interface (GUI), a plurality of push notifications that is configured to change to show a current time for the user to reach the departure gate by the departure time of the departing flight based on:
        (i) based on the user-specific airport processing time and
        (ii) the travel time to the departure airport based on the geographic location of the computing device of the user for each of the at least one predefined mode of transportation.

2. The method according to claim 1, wherein the at least one predefined mode of transportation is selected from the group consisting of: a car, a train, a bus, a bicycle and a motorcycle.

3. The method according to claim 1, further comprising causing, by the processor, in real-time, to display on the GUI at least one recommendation to the user as to which of the at least one predefined mode of transportation to use that will enable the user to arrive at the departure gate in time for the departing flight.

4. The method according to claim 1, wherein the real-time flight information of the arriving and departing flights at the departure airport comprises at least 25 flights.

5. The method according to claim 1, wherein the airport-specific data in the predefined time interval further comprises: wait time information in response to push notifications to any of the plurality of users in the departure airport, flight price data, number of seats left on flights, a number of passengers in the departure airport identified from mobile device location tracking data, a number of users from the plurality of users checking baggage, shared passenger capacity data from public transportation servers, airport lounge data, or any combination thereof.

6. The method according to claim 1, further comprising training, by the processor, the at least one machine learning model by:
 (i) inputting airport-specific data for any of the plurality of users flying on flights from any departure airport to the at least one machine learning model; and
 (ii) comparing user-specific airport processing times outputted by the at least one machine learning model to historical airport capacity data from airport websites, government websites, airline websites, or any combination thereof.

7. The method according to claim 1, wherein the at least one machine learning model is an unsupervised machine learning model.

8. The method according to claim 1, further comprising transmitting, by the processor, in real-time over the communication network, to other servers managed by public transportation companies, navigation systems, or both, the user-specific airport processing time at the departure airport.

9. The method according to claim 1, wherein the GUI of the computing device comprises an application displayed on the display on the computing device of the user issued by the authorizing entity.

10. The method according to claim 1, further comprising:
 receiving, by the processor, in real-time over the communication network from the computing device, a user-chosen mode of transportation from the at least one predefined mode of transportation; and
 (ii) causing, by the processor, in real-time over the communication network, to display on the GUI, a navigation map based on the user-chosen mode of transportation to guide the user from the geographical location of the computing device to the departure gate.

11. A system, comprising:
 a memory for storing computer code; and
 a processor of a server managed by an authorizing entity, that when executing the computer code, causes the processor to:
 identify departing flight information in payment card transaction data from a plurality of users using payment cards issued by the authorizing entity;
 wherein the departing flight information designates a departure airport and a departure time;
 receive in real-time over a communication network, from a computing device of a user from the plurality of users, a geographical location of the computing device of the user;
 receive in real-time over the communication network, airport-specific data for a departure airport in a predefined time interval before a departure time of a departing flight of the user;
 wherein the airport-specific data comprises at least:
  (i) the departing flight information at the departure airport of the departing flight of the user,
  (ii) real-time flight information of arriving and departing flights at the departure airport,
  (iii) payment card transaction data of other users from the plurality of users received by the server from a plurality of point-of-sale (POS) devices at the departure airport in the predefined time interval before the departure time of the user, and
  (iv) transportation security administration (TSA) waiting times in the departure airport in the predefined time interval before the departure time of the user;
 input, in real-time, the airport-specific data into at least one machine learning model;
 receive, in real-time, from the at least one machine learning model, a user-specific airport processing time for the user to reach a departure gate within the departure airport by the departure time of the departing flight upon the user arriving to the departure airport, wherein, to determine the user-specific airport processing time, the machine learning model is configured to:
  estimate a number of passengers in the departure airport in the predefined time interval before the departure time of the departing flight of the user based at least in part on the payment card transaction data of other users, wherein the number of passengers in the departure airport comprises a first group of passengers estimated to be on the departing flight and a second group of passengers estimated to be on other departing flights based on the payment card transaction data; and
  determine the user-specific airport processing time based at least in part on the number of passengers in the departure airport in the predefined time interval before the departure time of the departing flight of the user to account for passenger congestion in the departure airport,
 receive, in real-time over the communication network from a remote server hosting a navigation system software application, a travel time from the geographical location of the computing device to the departure airport for at least one predefined mode of transportation;
 cause in real-time over the communication network, to display on a graphical user interface (GUI) on a display of the computing device, a time for the user to start travel to the departure airport based on the user-specific airport processing time and the travel time to the departure airport for each of the at least one predefined mode of transportation, so as to reach the departure gate by the departure time of the departing flight of the user; and
 update in real-time, the time displayed on the GUI for the user to start travel to the departure airport as the geographical location of the computing device of the user changes for each of the at least one predefined mode of transportation.

12. The system according to claim 11, wherein the at least one predefined mode of transportation is selected from the group consisting of: a car, a train, a bus, a bicycle and a motorcycle.

13. The system according to claim 11, wherein the processor is further configured to cause in real-time, to display on the GUI at least one recommendation to the user as to which of the at least one predefined mode of transportation to use that will enable the user to arrive at the departure gate in time for the departing flight.

14. The system according to claim 11, wherein the real-time flight information of the arriving and departing flights at the departure airport comprises at least 25 flights.

15. The system according to claim 11, wherein the airport-specific data in the predefined time interval further comprises: wait time information in response to push notifications to any of the plurality of users in the departure airport, flight price data, number of seats left on flights, a number of passengers in the departure airport identified from mobile device location tracking data, a number of users from the plurality of users checking baggage, shared passenger capacity data from public transportation servers, airport lounge data, or any combination thereof.

16. The system according to claim 11, wherein the processor is further configured to train the at least one machine learning model by:
(i) inputting airport-specific data for any of the plurality of users flying on flights from any departure airport to the at least one machine learning model; and
(ii) comparing user-specific airport processing times outputted by the at least one machine learning model to historical airport capacity data from airport websites, government websites, airline websites, or any combination thereof.

17. The system according to claim 11, wherein the at least one machine learning model is an unsupervised machine learning model.

18. The system according to claim 11, wherein the processor is further configured to transmit in real-time over the communication network, to other servers managed by public transportation companies, navigation systems, or both, the user-specific airport processing time at the departure airport.

19. The system according to claim 11, wherein the GUI of the computing device comprises an application displayed on the display on the computing device of the user issued by the authorizing entity.

20. The system according to claim 11, wherein the processor is further configured to:
(i) receive, in real-time over the communication network from the computing device, a user-chosen mode of transportation from the at least one predefined mode of transportation; and
(ii) cause in real-time over the communication network, to display on the GUI, a navigation map based on the user-chosen mode of transportation to guide the user from the geographical location of the computing device to the departure gate.

21. The system according to claim 11, wherein the machine learning model is further configured to:
receive flight price data; and
estimate, based at least in part on the flight price data, a number of passengers that are booked for the departing flight or another flight,
wherein the estimate of the number of passengers at the departure airport in the predefined time interval is further based at least in part on the number of passengers that are booked for the departing flight or another flight.

22. The system according to claim 11, wherein the machine learning model is further configured to:
receive flight seat occupancy data; and
estimate, based at least in part on the flight seat occupancy data, a number of passengers that are booked for the departing flight or another flight,
wherein the estimate of the number of passengers at the departure airport in the predefined time interval is further based at least in part on the number of passengers that are booked for the departing flight or another flight.

23. The system according to claim 11, wherein user-specific airport processing time is further determined based on an estimated time to traverse a path between an airport entrance and the departure gate.

24. The system according to claim 23, wherein the estimated time to traverse the path is adjusted based on the number of passengers estimated to be in the departure airport in the predefined time interval before the departure time of the departing flight of the user.

* * * * *